United States Patent
Kim et al.

(10) Patent No.: US 10,471,932 B2
(45) Date of Patent: Nov. 12, 2019

(54) APPARATUS AND METHOD FOR DETECTING POSITION

(71) Applicants: HYUNDAI MOTOR COMPANY, Seoul (KR); KIA MOTORS CORPORATION, Seoul (KR)

(72) Inventors: Sin Jung Kim, Hwaseong-si (KR); Seok Han Lee, Seoul (KR); Sang Woo Ji, Yongin-Si (KR); Kyu Hwan Chin, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/000,275

(22) Filed: Jun. 5, 2018

(65) Prior Publication Data

US 2019/0256050 A1    Aug. 22, 2019

(30) Foreign Application Priority Data

Feb. 21, 2018    (KR) .................. 10-2018-0020340

(51) Int. Cl.
*B60R 25/24* (2013.01)
*G07C 9/00* (2006.01)
(Continued)

(52) U.S. Cl.
CPC ........ *B60R 25/245* (2013.01); *G07C 9/00309* (2013.01); *H04W 4/80* (2018.02); *H04W 12/06* (2013.01); *B60R 2325/101* (2013.01); *B60R 2325/205* (2013.01); *G07C 2009/00507* (2013.01)

(58) Field of Classification Search
CPC ............ B60R 25/245; B60R 2325/101; B60R 2325/205; B60R 25/2009; B60R 25/209; B60R 25/246; G07C 9/00309; G07C 2009/00507; G07C 2209/63; G07C 2209/64; G07C 2009/00388;
(Continued)

(56) References Cited

U.S. PATENT DOCUMENTS 9,008,917 B2    4/2015 Gautama et al.
2008/0113619 A1*  5/2008 Torrance ................ G08C 17/00
                                                        455/41.2
(Continued)

FOREIGN PATENT DOCUMENTS

KR    10-2015-0064910 A    6/2015
KR    10-2017-0075986 A    7/2017
KR       10-1757214 B1     7/2017

*Primary Examiner* — Edwin C Holloway, III
(74) *Attorney, Agent, or Firm* — Morgan, Lewis & Bockius LLP

(57) ABSTRACT

A position detecting apparatus includes: a communicator performing pairing with a user terminal and transmitting a first signal including authentication information to the paired user terminal; a signal output device outputting a second signal generated based on the authentication information to an inside of a vehicle; and a vehicle controller generating the first signal and the second signal after the pairing with the user terminal is completed, and when a device authentication result is received from the user terminal based on the first signal and the second signal, detecting a position of the user terminal based on the received device authentication result.

19 Claims, 10 Drawing Sheets

(51) Int. Cl.
*H04W 12/06* (2009.01)
*H04W 4/80* (2018.01)

(58) Field of Classification Search
CPC ...... G07C 2009/00547; G08C 2201/20; G08C 2201/21; H04W 12/06; H04W 4/80
USPC .............................................. 340/5.72, 5.61
See application file for complete search history.

(56) References Cited

U.S. PATENT DOCUMENTS

| | | | |
|---|---|---|---|
| 2009/0136035 A1* | 5/2009 | Lee .................... | G07C 9/00309 380/270 |
| 2009/0167487 A1* | 7/2009 | Shah ....................... | G06F 21/35 340/5.2 |
| 2013/0278415 A1* | 10/2013 | Morgan, Jr. .......... | H04W 4/046 340/539.13 |
| 2016/0147990 A1 | 5/2016 | Schneider | |
| 2016/0272154 A1* | 9/2016 | Sanji ....................... | B60R 25/24 |
| 2017/0050615 A1* | 2/2017 | Schindler ................ | B60R 25/24 |
| 2017/0105101 A1* | 4/2017 | Santavicca ............. | H04B 17/27 |
| 2017/0309098 A1* | 10/2017 | Watters .............. | G07C 9/00309 |
| 2018/0099643 A1* | 4/2018 | Golsch .................... | B60R 25/24 |
| 2018/0115859 A1* | 4/2018 | Ghabra ................ | H04W 8/005 |
| 2018/0154866 A1* | 6/2018 | Sute .................. | G07C 9/00309 |
| 2018/0234797 A1* | 8/2018 | Ledvina ................. | B60R 25/24 |

* cited by examiner

APPARATUS AND METHOD FOR DETECTING POSITION

CROSS-REFERENCE TO RELATED APPLICATION

This application is based on and claims the benefit of priority to Korean Patent Application No. 10-2018-0020340, filed on Feb. 21, 2018, in the Korean Intellectual Property Office, the disclosure of which is incorporated herein in its entirety by reference.

TECHNICAL FIELD

The present disclosure relates to an apparatus and a method for detecting a position.

BACKGROUND

In recent years, technologies that control functions of a vehicle using a smartphone with a Bluetooth communication function have been developed.

A vehicle system identifies whether the smartphone is inside the vehicle through the Bluetooth communication with the smartphone and activates some of its functions in accordance with the result.

However, since a physical distance that enables Bluetooth devices to establish wireless communication with each other is about 30 meters, the vehicle system determines that the smartphone is within the vehicle even though the smartphone is not in the vehicle but near the vehicle.

In a conventional technology, a reception intensity of the Bluetooth signal between the vehicle system and the smartphone is used to identify whether the smartphone is inside or outside the vehicle. However, an accuracy of a method using the reception intensity of the Bluetooth signal is not reliable since changes in intensity of the Bluetooth signal are highly likely when a receiving terminal is in a noise environment or when there are objects or human body therebetween.

Thus, the vehicle system performs a second authentication process after the Bluetooth communication with the smartphone to identify whether the smartphone is inside or outside the vehicle. For example, the vehicle system performs the second authentication on the smartphone through a fingerprint recognition.

However, a separate module is required for the fingerprint recognition process.

SUMMARY

The present disclosure has been made to solve the above-mentioned problems occurring in the prior art while advantages achieved by the prior art are maintained intact.

An aspect of the present disclosure provides an apparatus and a method for detecting a position of a user terminal, which are capable of generating a sound wave signal or a magnetic signal based on an authentication information after a vehicle and the user terminal are connected through short-range communication scheme and simply and accurately detecting the position of the user terminal based on the authentication result of the generated signal.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a position detecting apparatus includes: a communicator performing pairing with a user terminal and transmitting a first signal including authentication information to the paired user terminal; a signal output device outputting a second signal generated based on the authentication information to inside of a vehicle; and a vehicle controller generating the first signal and the second signal after the pairing with the user terminal is completed and, when a device authentication result is received from the user terminal based on the first signal and the second signal, detecting a position of the user terminal based on the received device authentication result.

According to another aspect of the present disclosure, a position detecting method includes: performing, by a communicator, pairing with a user terminal; transmitting, by the communicator, a first signal including authentication information to the paired user terminal; outputting, by a signal output device, a second signal generated based on the authentication information to inside of a vehicle; and detecting, by a vehicle controller, a position of the user terminal based on a device authentication result when the device authentication result is received from the user terminal based on the first signal and the second signal.

According to the above, the sound wave signal or the magnetic signal is generated based on the authentication information after the vehicle is connected to the user terminal through the short-range communication scheme. The position of the user terminal may be simply and accurately detected based on the authentication result of the generated signal.

DRAWINGS

The above and other objects, features and advantages of the present disclosure will be more apparent from the following detailed description taken in conjunction with the accompanying drawings.

Figure 7:
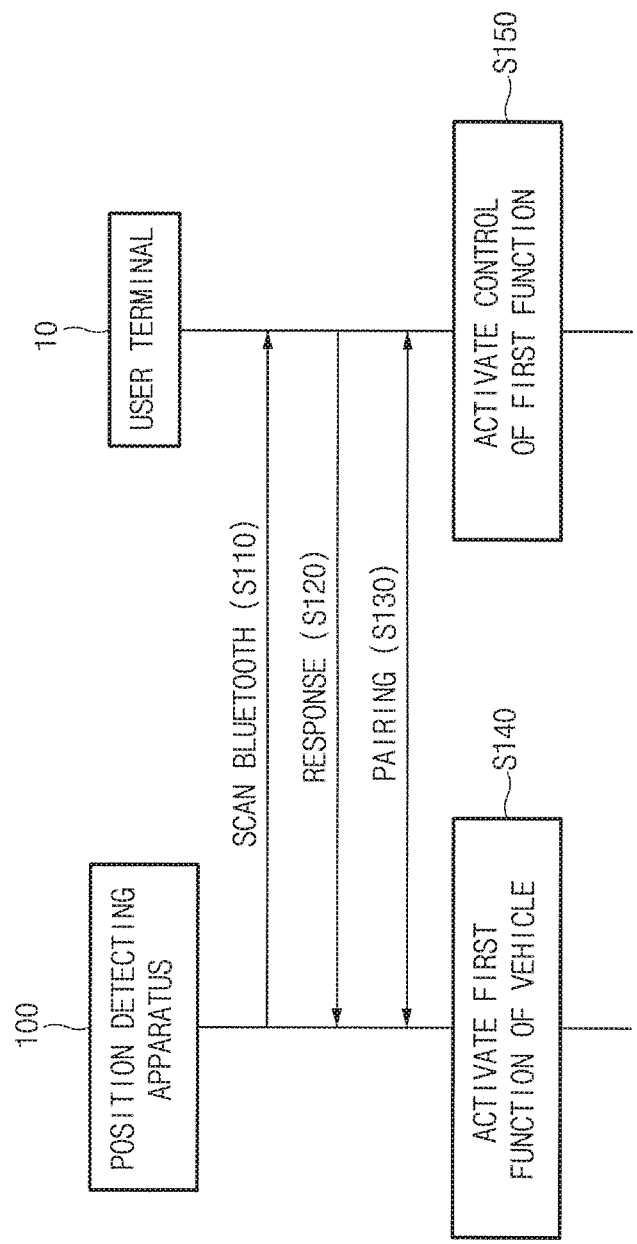
Figure 8:
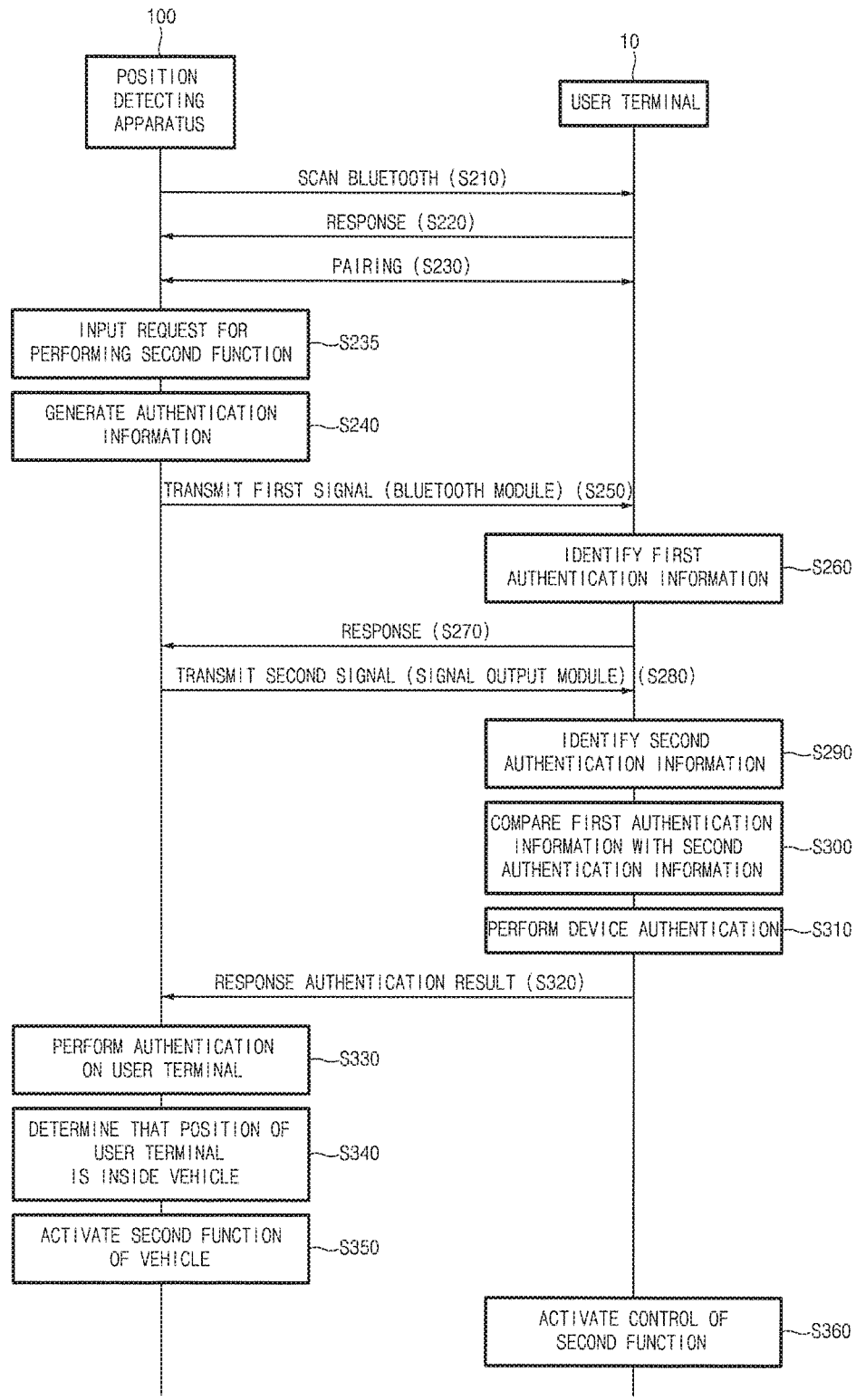
Figure 9:
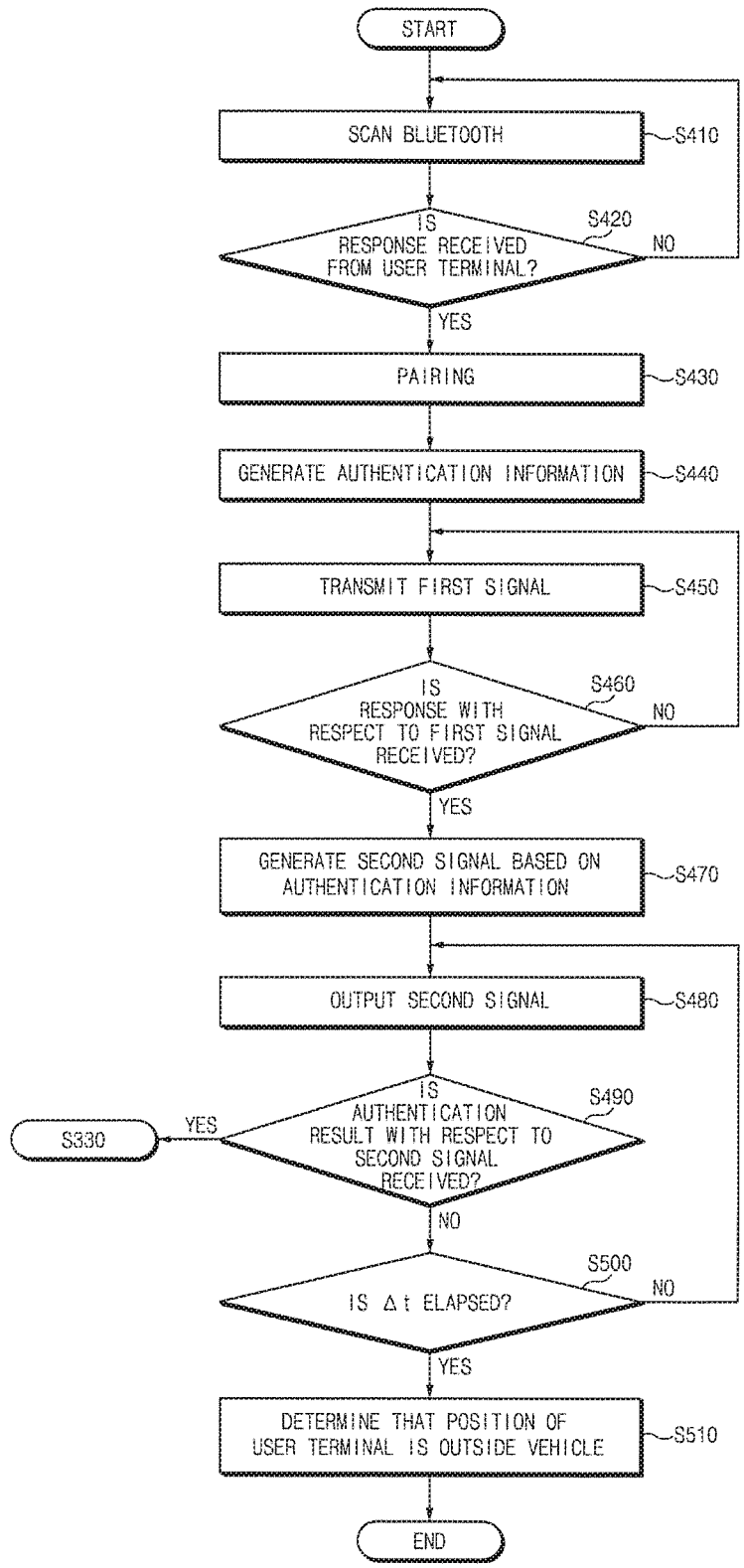
Figure 10:
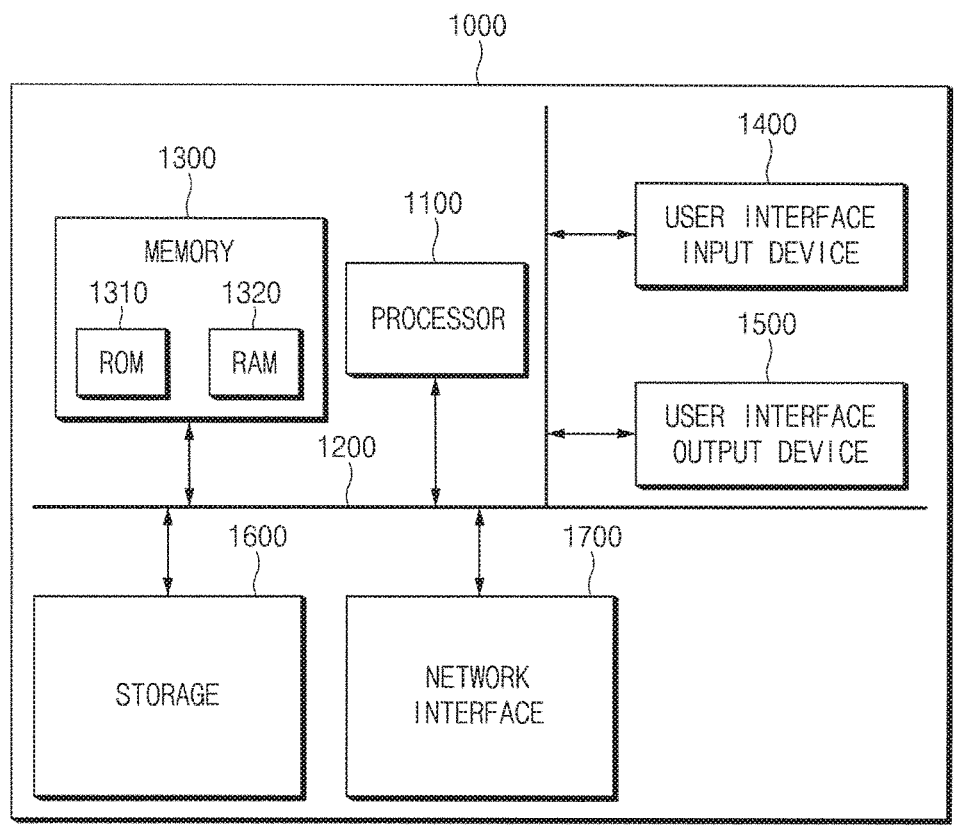

FIGS. 4A-4D, 5A-5C, 6A, and 6B are views illustrating an operation of a position detecting apparatus according to an exemplary embodiment of the present disclosure;

FIGS. 7 to 9 are flowcharts illustrating a position detecting method according to an exemplary embodiment of the present disclosure; and FIG. 10 is a block diagram illustrating a configuration of a computing system that executes a position detecting method according to an exemplary embodiment of the present disclosure.

DETAILED DESCRIPTION

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms is $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
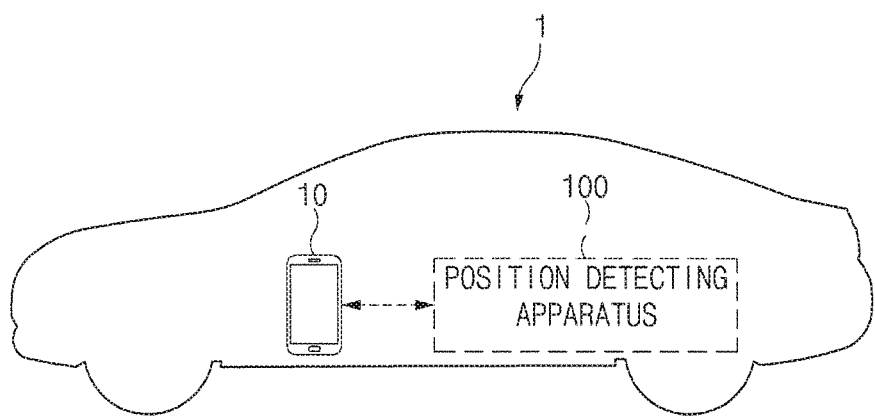
FIG. 1 is a view illustrating a vehicle system to which a position detecting apparatus is applied according to an exemplary embodiment of the present disclosure.

FIG. 1 is a view illustrating a vehicle system to which a position detecting apparatus is applied according to an exemplary embodiment of the present disclosure.

As shown in FIG. 1, a vehicle system may include a position detecting apparatus 100 connected to a user terminal 10, which is located inside or outside a vehicle 1, through a short-range communication scheme to detect a position of the user terminal 10.

The position detecting apparatus 100 transmits a first signal including authentication information to the user terminal 10 through the short-range communication scheme. The position detecting apparatus 100 generates a second signal based on the authentication information and outputs the second signal in the form of a sound wave signal or a magnetic signal when the position detecting apparatus 100 receives a response signal from the user terminal 10 with respect to the first signal.

In the present embodiment, the second signal may be output at an intensity that may be received inside the vehicle 1.

Accordingly, the user terminal 10 may receive the second signal only when the user terminal 10 is located inside the vehicle 1. When the user terminal 10 receives the second signal, the user terminal 10 may compare the authentication information of the first signal with the authentication information of the second signal to perform device authentication and may transmit the performed result of the device authentication to the position detecting apparatus 100.

In the present embodiment, the user terminal 10 may be a mobile device having a short-range communication function and including a module capable of inputting the second signal and may include at least one of, for example, a smart phone, a tablet personal computer, a mobile phone, a wearable device, or a smart watch.

The position detecting apparatus 100 may detect a position of the user terminal 10 depending on whether the device authentication result from the user terminal 10 is received. Detailed descriptions of the position detecting apparatus 100 will be described with reference to FIG. 2.

The position detecting apparatus 100 according to the present disclosure may be implemented inside the vehicle 1. In this case, the position detecting apparatus 100 may be integrally formed with internal controllers of the vehicle 1 or may be connected to the internal controllers of the vehicle 1 by a connection device after being implemented in a separated apparatus.

Figure 2:
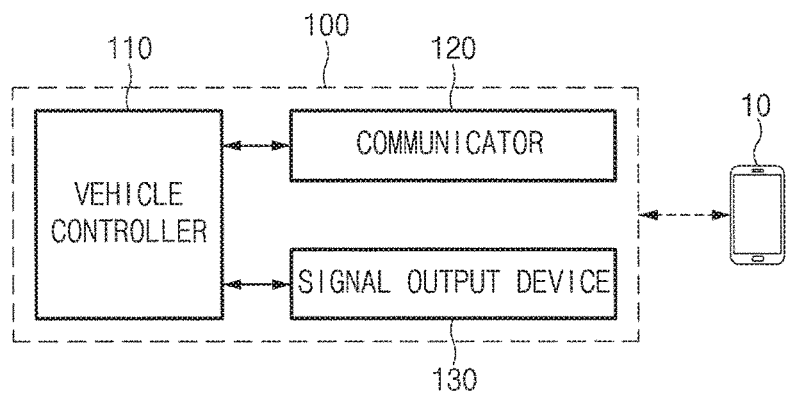
FIG. 2 is a view illustrating a configuration of a position detecting apparatus according to an exemplary embodiment of the present disclosure.

FIG. 2 is a view illustrating a configuration of a position detecting apparatus according to an exemplary embodiment of the present disclosure.

Referring to FIG. 2, the position detecting apparatus 100 may include a vehicle controller 110, a communicator 120, and a signal output device 130.

In the present embodiment, the communicator 120 is a hardware device capable of transmitting an analog or digital signal over wire or wirelessly and may include one or more components that enable communication with an external device. Examples of the communicator 120 include Bluetooth devices, infrared devices, modem, network card (using Ethernet), smartphone, Wi-Fi devices (using a Wi-Fi router), etc. in addition, the communicator 120 may include a communication module that supports a communication interface for the short-range communication. As an example, the communication module may include a Bluetooth communication module.

The Bluetooth communication module transmits a Bluetooth signal at a predetermined time interval and scans a signal of nearby user terminal 10. In this case, when the response signal, e.g., an advertising signal, with respect to the Bluetooth signal is received from the user terminal 10, a pairing is performed between the Bluetooth communication module and a Bluetooth communication module of the user terminal 10.

When the paring is completed between the Bluetooth communication module and the user terminal 10, the vehicle controller 110 may control the vehicle 1 to activate a first function of the vehicle 1. In the present embodiment, the first function may include functions, e.g., a remote control door lock and unlock function, a vehicle status information reading function, etc., which are capable of being implemented without a user authentication.

The vehicle controller 110 generates the authentication information when the pairing is completed between the Bluetooth communication module and the user terminal 10 and a second function is requested to be performed. As an example, the authentication information may be a randomly generated random number.

In this case, the vehicle controller 110 generates the first signal including the authentication information, and the Bluetooth communication module transmits the first signal generated by the vehicle controller 110 to the user terminal 10.

The Bluetooth communication module may receive the response signal, which corresponds to the first signal, from the user terminal 10.

The vehicle controller 110 generates the second signal based on the authentication information and transmits the second signal to the signal output device 130 when the response signal corresponding to the first signal is received from the user terminal 10.

The signal output device 130 is a hardware device arid may include a sound wave signal output module that outputs the sound wave signal corresponding to the second signal from the vehicle controller 110. In the present embodiment, the sound wave signal output module may include at least one of a speaker or a buzzer.

In this case, the signal output device 130 may control an intensity of the sound wave signal to the intensity that may be received inside the vehicle 1 when the signal output device 130 outputs the sound wave signal corresponding to the second signal. The intensity of the sound wave signal may be set to an intensity that is determined in advance through experimentation.

In addition, the signal output device 130 may output the sound wave signal at a non-audible frequency when the signal output device 130 outputs the sound wave signal corresponding to the second signal. For example, the signal output device 130 may output the second signal using an ultrasonic wave having a frequency higher than a human audible frequency range (about 20 Hz to about 20 kHz).

The signal output device 130 may include a magnetic signal output module that outputs the magnetic signal corresponding to the second signal from the vehicle controller 110. In this case, the signal output device 130 may control an intensity of the output signal to the intensity that may be received inside the vehicle 1 when the signal output device 130 outputs the sound wave signal or the magnetic signal corresponding to the second signal.

Accordingly, the user terminal 10 may receive the second signal only when the user terminal 10 is located inside the vehicle 1. In this case, the user terminal 10 may identify the authentication information from the first signal and the second signal and perform the device authentication based on the identified authentication information. The user terminal 10 may transmit the performed result of the device authentication to the position detecting apparatus 100 through the Bluetooth communication module.

Therefore, when the device authentication completion information is received from the user terminal 10 through the Bluetooth communication module, the vehicle controller 110 may detect that the user terminal 10 is located inside the vehicle 1 and may authenticate the user terminal 10.

The vehicle controller 110 may control the vehicle 1 to activate the second function when the authentication is completed on the user terminal 10. In the present embodiment, the second function may include functions requiting the user authentication such as a start on/off function.

When fail information about the device authentication is received from the user terminal 10 or the response signal corresponding to the second signal is not received, the vehicle controller 110 determines that the authentication process on the user terminal 10 fails. In this case, the vehicle controller 110 may detect that the user terminal 10 is located outside the vehicle 1.

The vehicle controller 110 may display the detected position information about the user terminal 10 through a display screen of the vehicle 1.

The position detecting apparatus 100 according to the present exemplary embodiment operated as described above may be implemented in one independent hardware including a memory and a processer processing each operation and driven as a hardware while being included in other hardware, e.g., a microprocessor or a general-purpose computer system.

In an exemplary embodiment, the communicator 120 and the signal output device 130 may be connected as a separate device or embedded in the vehicle controller 110 which may be an electronic control unit (ECU).

Figure 3:
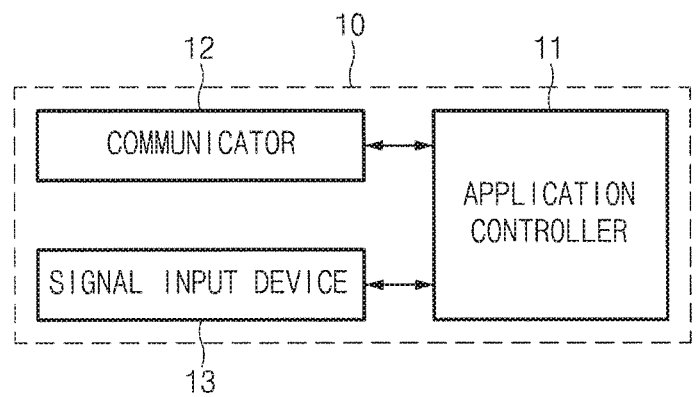
FIG. 3 is a view illustrating a configuration of a user terminal according to an exemplary embodiment of the present disclosure.

FIG. 3 is a view illustrating a configuration of a user terminal according to an exemplary embodiment of the present disclosure.

Referring to FIG. 3, the user terminal 10 may include an application controller 11, a communicator 12, and a signal input device 13.

Similar to the position detecting apparatus 100, the application controller 11, the communicator 12, and the signal input device 13 are hardware devices.

In the present embodiment, the communicator 12 may include a communication module that supports a communication interface for the short-range communication. As an example, the communication module may include a Bluetooth communication module.

When a scanning signal is received from the position detecting apparatus 100, the Bluetooth communication module transmits the advertising signal corresponding to the received scanning signal to perform a pairing between the Bluetooth communication module and a Bluetooth communication module of the position detecting apparatus 100.

In this case, the application controller 11 may control the first function of the vehicle 1 when the pairing is completed between the Bluetooth communication module arid the position detecting apparatus 100 and the first function of the vehicle 1 is activated.

The Bluetooth communication module may receive the first signal from the position. detecting apparatus 100 after the pairing is completed between the Bluetooth communication module and the position detecting apparatus 100.

The application controller 11 may identify first authentication information included in the first signal. In addition, the Bluetooth communication module may transmit the response signal with respect to the first signal to the position detecting apparatus 100.

The second signal output from the position detecting apparatus 100 may be input to the signal input device 13. The signal input device 13 may include a microphone to which the second signal with the form of the sound wave signal is input.

The signal input device 13 may include a magnetometer to which the second signal with the form of the magnetic signal is input.

When the second signal with the form of the sound wave signal or the magnetic signal is input to the application controller 11 through the signal input device 13, the application controller 11 identifies second authentication information from the second signal input thereto.

The application controller 11 compares the first authentication information identified from the first signal with the second authentication information identified from the second signal and performs a device authentication according to the compared result.

When the first authentication information is the same as the second authentication information, the application controller 11 generates device authentication completion information. When the first authentication information is not the same as the second authentication information, the application controller 11 generates device authentication failure information.

The Bluetooth communication module transmits the device authentication result generated by the application controller 11 to the position detecting apparatus 100.

The application controller 11 may control the second function of the vehicle 1 when the second function of the vehicle 1 is activated based on the device authentication result transmitted to the position detecting apparatus 100.

FIGS. 4A to 6B are views illustrating an operation of a position detecting apparatus according to an exemplary embodiment of the present disclosure.

FIGS. 4A to 4D are views showing operations of the position detecting apparatus detecting the position of the user terminal.

Figure 4A:
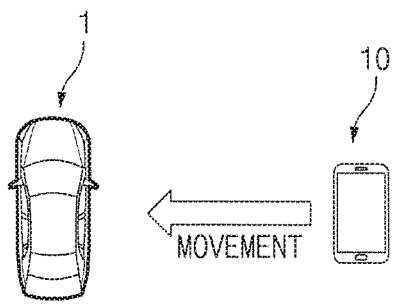
Figure 4B:
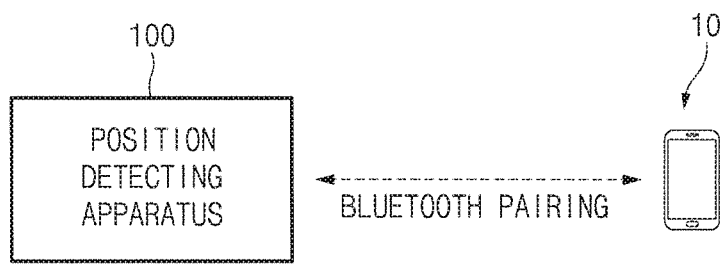

As shown in FIG. 4A, when the user terminal 10 moves into an area capable of performing the Bluetooth communication with the vehicle 1 including the position detecting apparatus 100, the pairing is performed between the position detecting apparatus 100 and the user terminal 10 through the Bluetooth communication as shown in FIG. 4B.

Figure 4C:
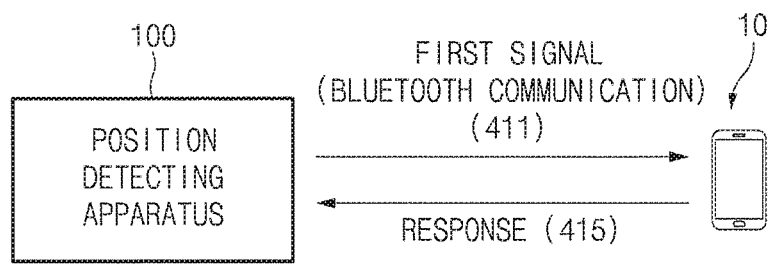

When the Bluetooth pairing is completed in FIG. 4B, the position detecting apparatus 100 transmits the first signal 411 including the authentication information to the user terminal 10 through the Bluetooth communication scheme as shown in FIG. 4C, in this case, the user terminal 10 identifies the authentication information from the first signal 411 and transmits the response signal 415 corresponding to the first signal 411 to the position detecting apparatus 100.

Figure 4D:
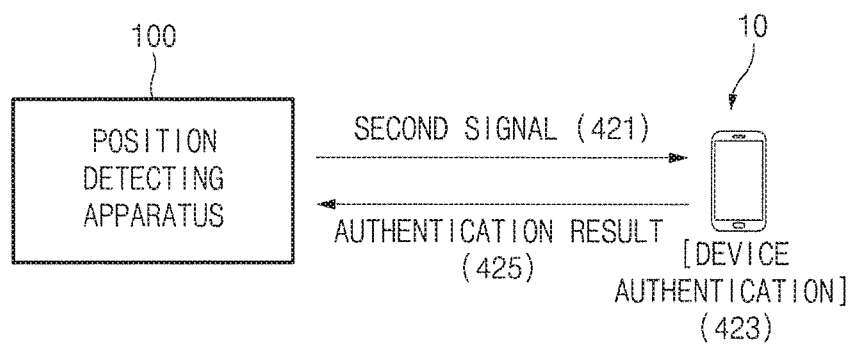

Then, the position detecting apparatus 100 outputs the second signal 421 generated based on the authentication information in the form of the sound wave signal or the magnetic signal as shown in FIG. 4D.

Figure 5A:
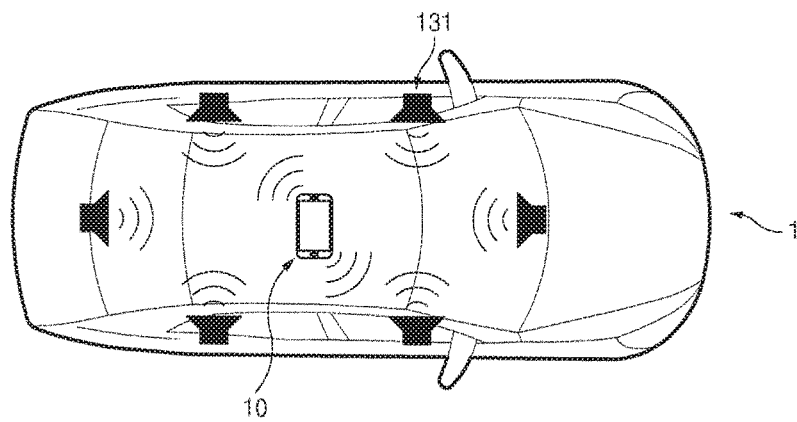

As an example, the position detecting apparatus 100 outputs the sound wave signal corresponding to the second signal using one or more speakers 131 installed in the vehicle 1 as shown in FIG. 5A. In this case, the user terminal 10 located inside the vehicle 1 may receive the sound wave signal through the microphone.

Figure 5B:
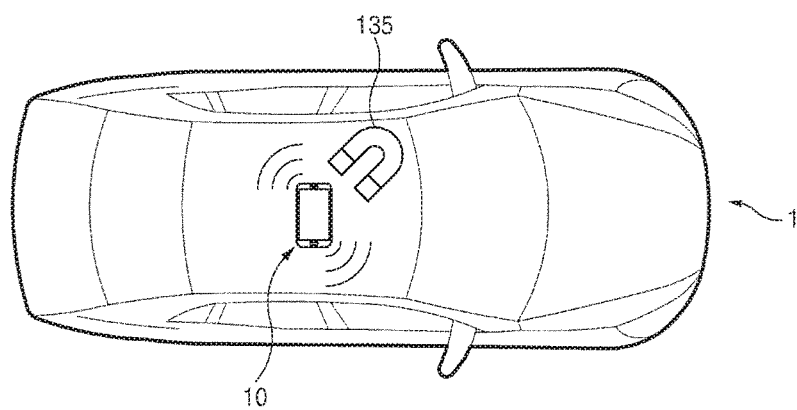

As another example, the position detecting apparatus 100 outputs the magnetic signal corresponding to the second signal using a magnetic substance 135 installed in the vehicle 1 as shown in FIG. 5B. In this case, the user terminal 10 located inside the vehicle 1 may receive the magnetic signal through the magnetometer.

In the present embodiment, since the second signal is output at the intensity that may be received inside the vehicle 1, the user terminal 10 may receive the second signal only when located inside the vehicle 1. Accordingly, the user terminal 10 located inside the vehicle 1 receives the second signal through the microphone or the magnetometer. The user terminal 10 identifies the authentication information from the second signal 421, compares the authentication information from the second signal 421 with the authentication information identified from the first signal, and performs the device authentication 423 according to the compared result. In addition, the user terminal 10 transmits the device authentication result to the position detecting apparatus 100 when the device authentication is completed.

Figure 6A:
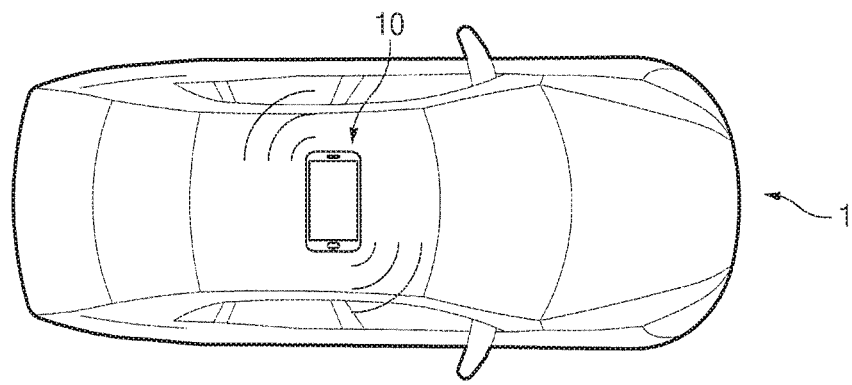

Accordingly, the position detecting apparatus 100 may authenticate the user terminal 10 depending on the device authentication result provided from the user terminal 10 and detect the position of the user terminal 10 inside the vehicle 1 as shown in FIG. 6A.

Figure 6B:
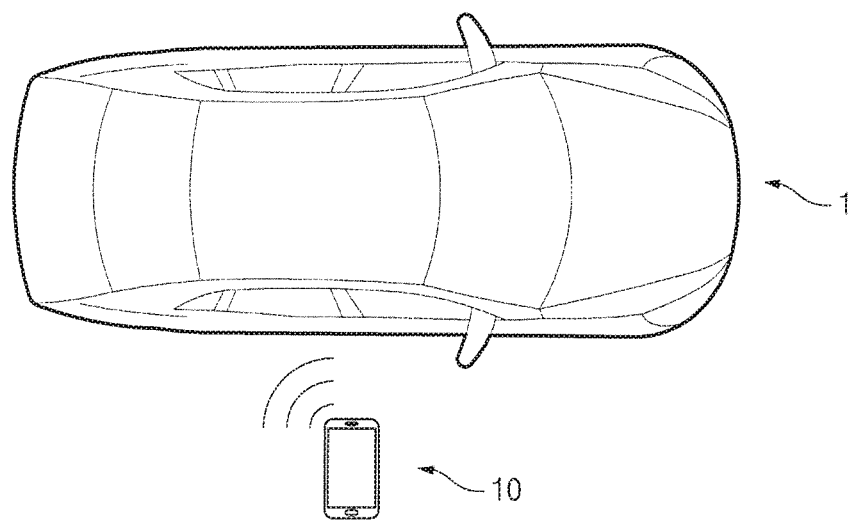

When the device authentication failure information is received from the user terminal 10 or the response signal corresponding to the second signal is not received, the vehicle controller 110 determines that the authentication of the user terminal 10 fails. In this case, the vehicle controller 110 may detect that the user terminal 10 is located outside the vehicle 1 as shown in FIG. 6B.

Figure 5C:
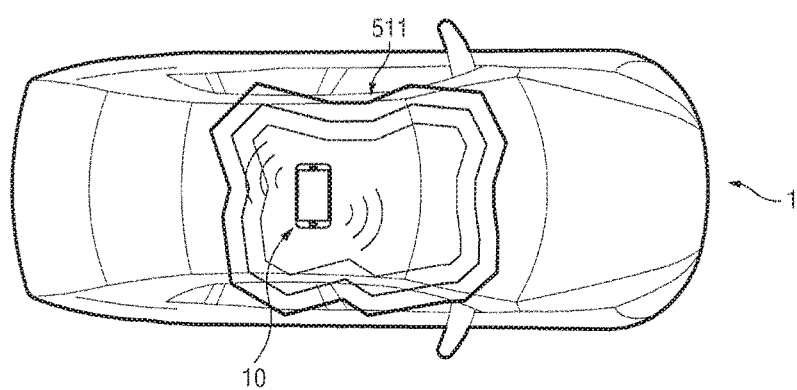

As another example, the user terminal 10 stores a magnetic field map 511 with respect to an interior space of the vehicle 1 in advance as shown in FIG. 5C. The magnetic field map 511 is to detect the position of the user terminal 10 by using a principle in which a sensing value becomes different by each area depending on an arrangement of structures in the vehicle 1.

When the magnetic signal corresponding to the second signal is received from the position detecting apparatus 100, the user terminal 10 may map the sensing value of the received magnetic signal to the magnetic field map 511 to detect the position of the user terminal 10 inside the vehicle 1. In this case, the user terminal 10 may transmit the position information of the user terminal 10 to the position detecting apparatus 100.

Accordingly, the position detecting apparatus 100 may detect the position information of the user terminal 10 from the information provided from the user terminal 10.

Hereinafter, an operation of the position detecting apparatus, which has the above-mentioned configurations, according to the present disclosure will be described in detail.

FIGS. 7 to 9 are flowcharts illustrating a position detecting method according to an exemplary embodiment of the present disclosure.

All of or a part of the steps method and/or operations of the foregoing embodiments can be realized using computer hardware and computer programs executed thereon.

FIG. 7 shows an operation for activating the first function of the vehicle 1 through the pairing between the position detecting apparatus and the user terminal.

As shown in FIG. 7, the position detecting apparatus 100 transmits the Bluetooth signal at the predetermined time interval and scans the signal of nearby user terminal 10 (S110). In this case, when the response signal with respect to the Bluetooth signal is received from the user terminal 10 (S120), the pairing is performed between the position detecting apparatus 100 and the user terminal 10 (S130).

In operation S130, when the pairing is completed between the position detecting apparatus 100 and the user terminal 10, the position detecting apparatus 100 activates the first function of the vehicle 1 (S140).

In this case, the user terminal 10 activates a control function of the first function to control the first function of the vehicle 1 (S150).

FIG. 8 shows an operation for activating the second function through the authentication between the position detecting apparatus and the user terminal.

As shown in FIG. 8, the position detecting apparatus 100 transmits the Bluetooth signal at the predetermined time interval and scans the signal of nearby user terminal 10 (S210). In this case, when the response signal with respect to the Bluetooth signal is received from the user terminal 10 (S220), the pairing is performed between the position detecting apparatus 100 and the user terminal 10 (S230).

In operation S230, when the second function is requested to be performed after the pairing is completed between the position detecting apparatus 100 and the user terminal 10 (S235), the position detecting apparatus 100 generates the authentication information (S240).

The position detecting apparatus 100 generates the first signal including the authentication information generated in operation S240 and transmits the first signal to the user terminal 10 (S250). The position detecting apparatus 100 transmits the first signal to the user terminal 10 through the Bluetooth communication module.

The user terminal 10 identifies the first authentication information from the first signal received in operation S250 (S260) and transmits the response signal to the position detecting apparatus 100 (S270).

In addition, when the response signal corresponding to the first signal is received from the user terminal 10, the position detecting apparatus 100 generates the second signal based on the authentication information generated in operation S240 and outputs the second signal to the user terminal 10 (S280). In this case, the position detecting apparatus 100 outputs the second signal through the signal output module, e.g., the microphone, the buzzer, or the magnetometer.

The user terminal 10 may receive the second signal output by the position detecting apparatus 100 when the user terminal 10 is located inside the vehicle 1.

In this case, the user terminal 10 identifies the second authentication information from the second signal received in operation S280 (S290), compares the first authentication information received in operation S260 with the second authentication information received in operation S290 (S300), and performs the device authentication (S310).

When the device authentication is completed, the user terminal 10 transmits the device authentication result to the position detecting apparatus 100 (S320).

The position detecting apparatus 100 performs the authentication on the user terminal 10 based on the authentication result received in operation S320 (S330). The position detecting apparatus 100 may perform the authentication on the user terminal 10 when the authentication result received in operation S320 includes the device authentication completion information. When the authentication result includes the device authentication failure information, it is determined that the authentication of the user terminal is failed.

When the user terminal authentication is completed in operation S330, the position detecting apparatus 100 determines that the user terminal 10 is located inside the vehicle 1 (S340) and activates the second function of the vehicle 1 (S350).

When the second function of the vehicle 1 is activated, the user terminal 10 activates the control function of the second function to control the second function of the vehicle 1 (S360).

FIG. 9 shows an operation for detecting the position of the user terminal located outside the vehicle.

As shown in FIG. 9, the position detecting apparatus 100 transmits the Bluetooth signal at the predetermined time interval and scans the signal of nearby user terminal 10 (S410). In this case, when the response signal with respect to the Bluetooth signal is received from the user terminal 10 (S420), the pairing is performed between the position detecting apparatus 100 and the user terminal 10 (S430).

In operation S430, when the second function is requested to be performed after the pairing is completed between the position detecting apparatus 100 and the user terminal 10, the position detecting apparatus 100 generates the authentication information (S440).

The position detecting apparatus 100 generates the first signal including the authentication information generated in operation S440 and transmits the first signal to the user terminal 10 (S450). The position detecting apparatus 100 transmits the first signal to the user terminal 10 through the Bluetooth communication module.

When the response signal corresponding to the first signal is received from the user terminal 10, the position detecting apparatus 100 generates the second signal based on the authentication information generated in operation S440 and outputs the second signal to the user terminal 10 (S480). In this case, the position detecting apparatus 100 outputs the second signal through the signal output module, e.g., the microphone, the buzzer, or the magnetometer.

When the device authentication result with respect to the second signal is received, the position detecting apparatus 100 enters operation S330 of FIG. 8 to perform subsequent operations.

When the device authentication result with respect to the second signal is not received after a predetermined time has elapsed (S490 and S500), the position detecting apparatus 100 determines that the user terminal authentication is failed and determines that the user terminal 10 is located outside the vehicle 1 (S510).

When it is determined that the user terminal 10 is located outside the vehicle 1, the position detecting apparatus 100 activates only the first function without activating the second function.

FIG. 10 is a block diagram illustrating a configuration of a computing system that executes the position detecting method according to an exemplary embodiment of the present disclosure.

Referring to FIG. 10, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or combinations thereof; executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. A position detecting apparatus comprising:
a communicator configured to:
perform pairing with a user terminal, and
transmit a first signal comprising authentication information to the paired user terminal;
a signal output device configured to output a second signal generated based on the authentication information to inside of a vehicle; and
a vehicle controller configured to:
generate the first signal and the second signal after the pairing with the user terminal is completed, and
when a result of a device authentication is received from the user terminal based on the first signal and the second signal, detect a position of the user terminal based on the received result of the device authentication,
wherein the first signal and the second signal have a different communication scheme from each other, and wherein the device authentication is performed by comparing the authentication information of the first signal with authentication information of the second signal.

2. The position detecting apparatus of claim 1, wherein the signal output device is configured to output the second signal when a response signal corresponding to the first signal is received.

3. The position detecting apparatus of claim 1, wherein the signal output device comprises a sound wave signal output module that outputs a sound wave signal corresponding to the second signal.

4. The position detecting apparatus of claim 1, wherein the signal output device outputs a magnetic signal corresponding to the second signal.

5. The position detecting apparatus of claim 1, wherein the vehicle controller is configured to activate a first function of the vehicle when the pairing with the user terminal is completed.

6. The position detecting apparatus of claim 5, wherein the first function comprises at least one of a remote control door lock and unlock function or a vehicle status information reading function.

7. The position detecting apparatus of claim 1, wherein the vehicle controller is configured to:
perform an authentication on the user terminal based on the result of the device authentication provided from the user terminal, and
determine that the user terminal is located inside the vehicle to activate a second function of the vehicle when the authentication of the user terminal is completed.

8. The position detecting apparatus of claim 7, wherein the second function comprises a start on/off function.

9. The position detecting apparatus of claim 1, wherein the communicator communicates via Bluetooth communication.

10. A position detecting method comprising steps of:
performing, by a communicator, pairing with a user terminal;
transmitting, by the communicator, a first signal comprising authentication information to the paired user terminal;
outputting, by a signal output device, a second signal generated based on the authentication information to inside of a vehicle; and
detecting, by a vehicle controller, a position of the user terminal based on a result of a device authentication when the result of the device authentication is received from the user terminal based on the first signal and the second signal,
wherein the first signal and the second signal have a different communication scheme from each other, and
wherein the device authentication is performed by comparing the authentication information of the first signal with authentication information of the second signal.

11. The method of claim 10, wherein the step of outputting the second signal to the inside of the vehicle comprises outputting the second signal when a response signal corresponding, to the first signal is received.

12. The method of claim 10, wherein the step of outputting the second signal comprises outputting a sound wave signal corresponding to the second signal through a sound wave signal speaker.

13. The method of claim 10, wherein the step of outputting the second signal comprises outputting a magnetic signal corresponding to the second signal.

14. The method of claim 10, further comprising a step of activating a first function of the vehicle when the pairing with the user terminal is completed.

15. The method of claim 14, wherein the first function comprises at least one of a remote control door lock and unlock function or a vehicle status information reading function.

16. The method of claim 10, wherein the step of detecting the position of the user terminal comprises:
performing an authentication on the user terminal based on the result of the device authentication provided from the user terminal; and
determining that the user terminal is located inside the vehicle when the authentication of the user terminal is completed.

17. The method of claim 16, further comprising a step of activating a second function of the vehicle when it is determined, that the user terminal is located inside the vehicle.

18. The method of claim 17, wherein the second function comprises a start on/off function.

19. The method of claim 10, wherein first signal is transmitted to the user terminal through Bluetooth communication.

* * * * *